(12) United States Patent
Ojima et al.

(10) Patent No.: US 11,660,878 B2
(45) Date of Patent: May 30, 2023

(54) PRINT SYSTEM

(71) Applicant: ALTEMIRA Co., Ltd., Tokyo (JP)

(72) Inventors: Shinichi Ojima, Tokyo (JP); Kazunori Ikeda, Tokyo (JP)

(73) Assignee: ALTEMIRA Co., Ltd., Tokyo (JP)

( * ) Notice: Subject to any disclaimer, the term of this patent is extended or adjusted under 35 U.S.C. 154(b) by 141 days.

(21) Appl. No.: 17/295,040

(22) PCT Filed: Dec. 11, 2019

(86) PCT No.: PCT/JP2019/048528
§ 371 (c)(1),
(2) Date: May 19, 2021

(87) PCT Pub. No.: WO2020/129779
PCT Pub. Date: Jun. 25, 2020

(65) Prior Publication Data
US 2021/0323317 A1  Oct. 21, 2021

(30) Foreign Application Priority Data

Dec. 18, 2018  (JP) .............................. JP2018-236684

(51) Int. Cl.
*B41J 3/407* (2006.01)
*B41F 17/18* (2006.01)

(52) U.S. Cl.
CPC ........... *B41J 3/40733* (2020.08); *B41F 17/18* (2013.01); *B41J 3/4073* (2013.01); *B41J 2203/01* (2020.08); *B65G 2201/0252* (2013.01)

(58) Field of Classification Search
CPC ... B41J 3/40733; B41F 17/002; B41F 17/006; B41F 17/18
See application file for complete search history.

(56) References Cited

U.S. PATENT DOCUMENTS

| 6,769,357 B1 | 8/2004 | Finan |
| 2010/0192517 A1 | 8/2010 | Schach |
| 2010/0257819 A1 | 10/2010 | Schach |

(Continued)

FOREIGN PATENT DOCUMENTS

| EP | 2919994 | 9/2015 |
| EP | 3733412 | 11/2020 |

(Continued)

OTHER PUBLICATIONS

"International Search Report (Form PCT/ISA/210) of PCT/JP2019/048528," dated Feb. 18, 2020, with English translation thereof, pp. 1-4.

(Continued)

*Primary Examiner* — Shelby L Fidler
(74) *Attorney, Agent, or Firm* — JCIPRNET

(57) ABSTRACT

Provided is a print system including: a moving body supporting a can body and moving; an annular moving route that is an annular-shaped moving route, along which the moving body moves, including at least one of a linear moving route extending from an upper side toward a lower side and is formed linearly, and a linear moving route extending from the lower side toward the upper side and is formed linearly; and an image forming unit performing image formation onto the can body supported by the moving body.

14 Claims, 5 Drawing Sheets

(56) References Cited

U.S. PATENT DOCUMENTS

| | | |
|---|---|---|
| 2013/0019566 A1 | 1/2013 | Schach |
| 2014/0028771 A1 | 1/2014 | Yamada et al. |
| 2015/0298467 A1 | 10/2015 | Cofler |
| 2016/0136966 A1 | 5/2016 | Cassoni et al. |
| 2016/0136968 A1 | 5/2016 | Cassoni et al. |
| 2016/0207717 A1* | 7/2016 | Senn ................ B65G 37/02 |
| 2017/0050446 A1 | 2/2017 | Clippingdale et al. |
| 2017/0341420 A1 | 11/2017 | Cofler |
| 2018/0264804 A1 | 9/2018 | Chishiki et al. |
| 2018/0304650 A1 | 10/2018 | Belval et al. |
| 2019/0070866 A1 | 3/2019 | Kimura et al. |
| 2019/0248128 A1 | 8/2019 | Sharp et al. |
| 2019/0263110 A1 | 8/2019 | Sharp et al. |
| 2019/0263146 A1 | 8/2019 | Sharp et al. |
| 2020/0171852 A1 | 6/2020 | Cofler |
| 2020/0361223 A1 | 11/2020 | Ojima et al. |
| 2021/0197547 A1* | 7/2021 | Landa ................ B41J 3/4073 |

FOREIGN PATENT DOCUMENTS

| | | | |
|---|---|---|---|
| JP | 2012232771 | 11/2012 | |
| JP | 2017515704 | 6/2017 | |
| JP | 2017226176 | 12/2017 | |
| JP | 2018500198 | 1/2018 | |
| WO | 2009018893 | 2/2009 | |
| WO | 2009112161 | 9/2009 | |
| WO | 2012147695 | 11/2012 | |
| WO | 2017187863 | 11/2017 | |
| WO | 2018083167 | 5/2018 | |
| WO | WO-2020053709 A1 * | 3/2020 | ............ B41F 1/16 |

OTHER PUBLICATIONS

"Search Report of Europe Counterpart Application", dated Jan. 4, 2022, p. 1-p. 9.

* cited by examiner

PRINT SYSTEM

CROSS-REFERENCE TO RELATED APPLICATION

This application is a 371 application of the international PCT application serial no. PCT/JP2019/048528, filed on Dec. 11, 2019, which claims the priority benefits of Japan application no. 2018-236684, filed on Dec. 18, 2018. The entirety of each of the above-mentioned patent applications is hereby incorporated by reference herein and made a part of this specification.

TECHNICAL FIELD

The present invention relates to a print system.

BACKGROUND ART

In Patent Document 1, there is disclosed a printing device including a mandrel wheel, plural automatically-rotatable mandrels provided to the mandrel wheel, and an inkjet printing station for forming a print image at least on the body part of the outer surface of the seamless can mounted on the mandrel by inkjet printing.

CITATION LIST

Patent Literature

Patent Document 1: Japanese Patent Application Laid-Open Publication No. 2012-232771

SUMMARY OF INVENTION

Technical Problem

In a print system performing printing on a can body, a moving body supporting a can body is moved to perform processing on the can body in some cases.

Here, in the case where the processing on the can body is to be performed when the moving body is positioned on a linear moving route, degradation of processing accuracy arising from the positional accuracy of the moving body can be suppressed, as compared to the case in which the processing is to be performed on the moving body positioned on a moving route with a curvature. By the way, a linear moving route provided to extend in a width direction of a print system increases an occupation area of the print system.

An object of the present invention is to improve accuracy of processing for a can body and reduce an occupation area of a print system.

Solution to Problem

A print system to which the present invention is applied includes: a moving body supporting a can body and moving; an annular moving route that is an annular-shaped moving route, along which the moving body moves, including at least one of a linear moving route extending from an upper side toward a lower side and is formed linearly, and a linear moving route extending from the lower side toward the upper side and is formed linearly; and an image forming unit performing image formation onto the can body supported by the moving body.

Here, the linear moving route may be disposed along a vertical direction.

Moreover, the horizontal moving route that is a moving route extending along a horizontal direction.

Moreover, the image formation onto the can body supported by the moving body may be performed by the image forming unit when the moving body is positioned on the horizontal moving route.

Moreover, the horizontal moving route may extend along the horizontal direction and may be formed linearly.

Moreover, the horizontal moving route may include plural horizontal moving routes, the routes being provided to be displaced from one another in an up-and-down direction.

Moreover, an upper moving route and a lower moving route may be provided as the plural horizontal moving routes displaced from one another in the up-and-down direction, and the upper moving route and the lower moving route may be disposed in parallel with each other.

Moreover, when the upper moving route and the lower moving route are projected downward in the vertical direction, the upper moving route and the lower moving route may overlap each other.

Moreover, an upper moving route and a lower moving route may be provided as the plural horizontal moving routes displaced from one another in the vertical direction, and a processing unit performing processing on the can body supported by the moving body may be provided on each of both lateral sides of the upper moving route and the lower moving route.

Moreover, the print system may further include a processing unit performing processing on the can body supported by the moving body positioned on the linear moving route.

Moreover, the processing unit may perform inspection of the can body.

Moreover, a first linear moving route extending from the upper side to the lower side, and a second linear moving route extending from the lower side to the upper side may be provided as the linear moving route, and a processing unit performing processing on the can body supported by the moving body may be provided on each of both lateral sides of the first linear moving route and the second linear moving route.

Moreover, a first linear moving route extending from the upper side to the lower side, and a second linear moving route extending from the lower side to the upper side may be provided as the linear moving route, and the first linear moving route and the second linear moving route may be disposed in parallel with each other.

Moreover, the annular moving route may be disposed on a plane extending along a vertical direction.

Moreover, the print system may further include: a paint application unit applying paint on an outer surface of the can body after the image formation onto the outer surface of the can body is performed by the image forming unit; and an inspection unit performing inspection of an image formed on the outer surface by the image forming unit before the paint is applied by the paint application unit.

Moreover, the print system may further include: a discharge unit discharging a can body, a result of inspection of which performed by the inspection unit satisfies a predetermined condition, from the print system, wherein the discharge unit is disposed on an upstream side of the paint application unit in a moving direction of the can body.

Advantageous Effects of Invention

According to the present invention, it is possible to improve accuracy of processing for a can body and reduce an occupation area of a print system.

DESCRIPTION OF EMBODIMENT

Hereinafter, an exemplary embodiment according to the present invention will be described with reference to attached drawings.

Figure 1:
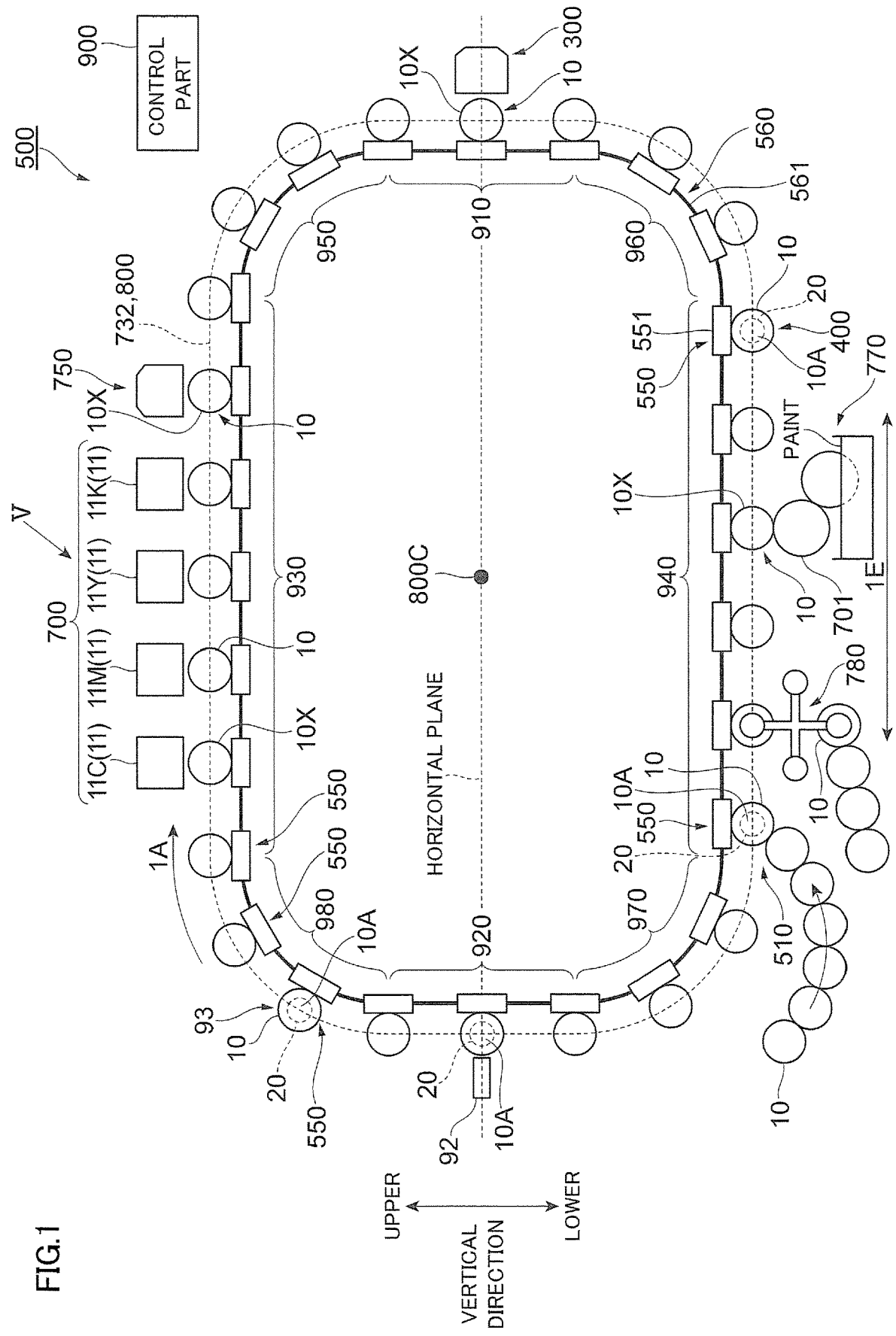
FIG. 1 is a side elevational view of a print system.

FIG. 1 is a side elevational view of a print system 500.

The print system 500 is provided with a can body supply part 510 to which can bodies 10 are supplied. In the can body supply part 510, the can body 10 is supplied (attached) to a support member 20 supporting the can body 10.

Specifically, the support member 20 is formed into a cylindrical shape and the support member 20 is inserted into the cylindrically-shaped can body 10; thereby the can body 10 is supplied to the support member 20.

Further, the print system 500 is provided with plural moving units 550 as an example of moving bodies that move while supporting the can bodies 10.

In the exemplary embodiment, the support member 20 supporting the can body 10 is attached to the moving unit 550, and the can body 10 moves together with the moving unit 550.

FIG. 1 shows a case in which the moving unit 550 supports a single can body 10; however, as will be described later, plural can bodies 10 may be placed on the moving unit 550, and thereby the single moving unit 550 may support the plural can bodies 10.

Here, the support member 20 is formed into a cylindrical shape and further, the support member 20 is provided rotatable state in the circumferential direction. In the exemplary embodiment, the can body 10 is supported by the support member 20 that is rotatable in the circumferential direction, and thereby the can body 10 is supported in the state being rotatable in the circumferential direction.

The can body 10 is formed into a cylindrical shape and an opening portion is provided at one end thereof. Moreover, the other end of the can body 10 is closed and the other end is provided with a bottom portion 10A. The support member 20 is inserted into the can body 10 from the opening portion.

Further, in the exemplary embodiment, a moving mechanism 560 that functions as a mover unit that moves the moving units 550 is provided. The moving mechanism 560 is provided with an annular-shaped guidance member 561 that guides the moving units 550.

Each of the moving units 550 is guided by the guidance member 561 and orbitally moves along a predetermined annular-shaped moving route 732. With this, in the exemplary embodiment, the support member 20 provided to the moving unit 550 also moves along the annular moving route 732.

Further, in the exemplary embodiment, the can body 10 supported by the support member 20 moves along the predetermined annular-shaped can body moving route 800.

The annular moving route 732 (the same is true for the can body moving route 800) is disposed so that the axial center 800C thereof is arranged along the horizontal direction. To put it another way, the can body moving route 800 is disposed around the axial center 800C along the horizontal direction. Here, the axial center 800C extends in the direction perpendicular to the page in FIG. 1.

To additionally describe, the annular moving route 732 is disposed on a plane extending along the vertical direction. To put it another way, the annular moving route 732 is disposed on a plane extending along the page of FIG. 1.

In the exemplary embodiment, the support member 20 and the can body 10 orbitally move around the axial center 800C extending in the direction perpendicular to the page in the figure.

The annular moving route 732 is provided with a first linear moving route 910 formed linearly from the upper side to the lower side, and a second linear moving route 920 formed linearly from the lower side to the upper side.

Here, the first linear moving route 910 and the second linear moving route 920 are disposed along the vertical direction. In addition, the first linear moving route 910 and the second linear moving route 920 are disposed in parallel with each other.

Note that the exemplary embodiment is provided with both of the first linear moving route 910 and the second linear moving route 920, but either one of them may be provided.

In addition, in the exemplary embodiment, the first linear moving route 910 and the second linear moving route 920 are disposed along the vertical direction; however, the first linear moving route 910 and the second linear moving route 920 may be provided in the state of being inclined to the vertical direction.

Moreover, in the exemplary embodiment, the full lengths of the first linear moving route 910 and the second linear moving route 920 are equal.

Further, in the exemplary embodiment, projection from the first linear moving route 910 side toward the second linear moving route 920 side in the horizontal direction makes the first linear moving route 910 and the second linear moving route 920 overlap each other.

To additionally describe, in the exemplary embodiment, projection of the first linear moving route 910 and the second linear moving route 920 in the horizontal direction and the direction perpendicular to the direction in which the axial center 800C extends makes the first linear moving route 910 and the second linear moving route 920 overlap each other.

Further, in the exemplary embodiment, the annular moving route 732 is provided with a horizontal moving route extending along the horizontal direction.

More specifically, in the exemplary embodiment, an upper moving route 930 and a lower moving route 940 are provided as the horizontal-direction moving route. The upper moving route 930 and the lower moving route 940 are provided to be displaced from each other in the up-and-down direction. Further, the upper moving route 930 and the lower moving route 940 extend along the horizontal direction and are formed linearly.

Moreover, in the exemplary embodiment, the full lengths of the upper moving route 930 and the lower moving route 940 are equal. In addition, the upper moving route 930 and the lower moving route 940 are disposed in parallel with each other.

Further, in the exemplary embodiment, the upper moving route 930 is positioned directly above the lower moving route 940, and projection of the upper moving route 930 and the lower moving route 940 downward in the vertical direction makes the upper moving route 930 and the lower moving route 940 overlap each other.

Further, the upper moving route 930 is provided to the uppermost portion of the annular moving route 732, whereas the lower moving route 940 is provided to the lowermost portion of the annular moving route 732.

Further, the annular moving route 732 is provided with a first connecting route 950 that connects the upper moving route 930 and the first linear moving route 910 and a second connecting route 960 that connects the first linear moving route 910 and the lower moving route 940.

The annular moving route 732 is also provided with a third connecting route 970 that connects the lower moving route 940 and the second linear moving route 920 and a fourth connecting route 980 that connects the second linear moving route 920 and the upper moving route 930.

Any of the first connecting route 950 to the fourth connecting route 980 has a curvature and is formed to draw an arc of ¼ of the circumference.

Here, the first connecting route 950 and the second connecting route 960 are formed to go downward as the moving unit 550 moves to the downstream side in the moving direction.

In addition, the third connecting route 970 and the fourth connecting route 980 are formed to go upward as the moving unit 550 moves to the downstream side in the moving direction.

In the exemplary embodiment, when the moving unit 550 moves along the first connecting route 950, the first linear moving route 910, and the second connecting route 960, the moving unit 550 moves downward.

In addition, when the moving unit 550 moves along the third connecting route 970, the second linear moving route 920, and the fourth connecting route 980, the moving unit 550 moves upward.

Further, the exemplary embodiment is provided with a first inspection device 92.

The first inspection device 92, as an example of a processing unit, carries out inspection of the can body 10, which is an example of processing for the can body 10 supported by the moving unit 550 positioned on the second linear moving route 920.

Specifically, the first inspection device 92 inspects whether or not the can body 10 is deformed.

Figure 2:
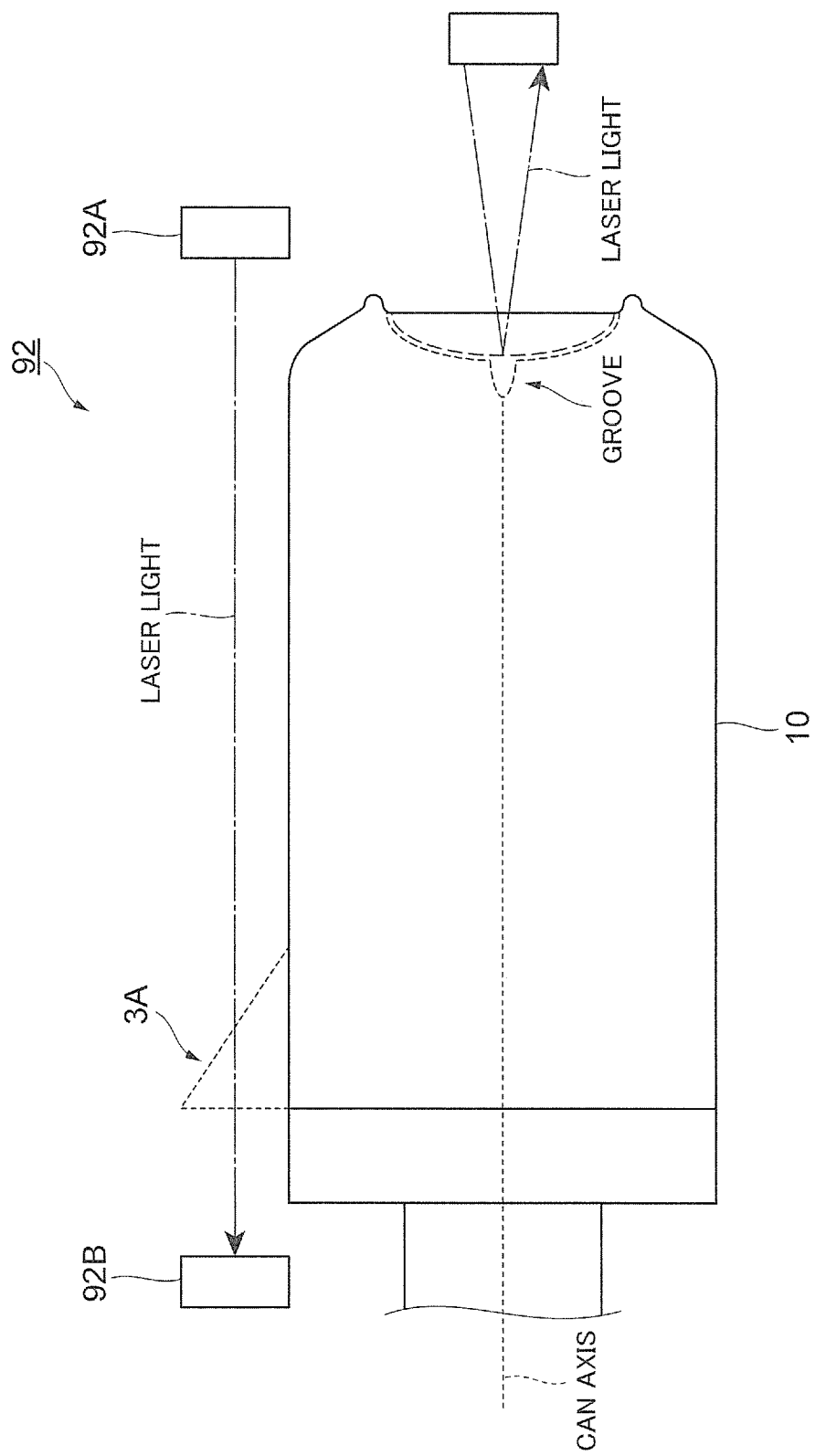
FIG. 2 is a diagram illustrating a first inspection device.

More specifically, the first inspection device 92 is provided with, as shown in FIG. 2 (the diagram illustrating the first inspection device 92), a light source 92A.

The light source 92A is provided on one end portion side of the can body 10 and the light source 92A emits laser light that proceeds in an axial direction of the can body 10 along the outer circumferential surface of the can body 10. Further, on the other end portion side of the can body 10, a light receiving portion 92B that receives laser light from the light source 92A is provided.

When part of the can body 10 is deformed as indicated by the reference sign 3A, the laser light is cut off and the light receiving portion 92B cannot receive the laser light. Consequently, deformation of the can body 10 is detected.

Then, in the exemplary embodiment, when it is determined by the first inspection device 92 that the can body 10 does not satisfy predetermined conditions (when it is determined that the can body 10 is deformed), a first discharge mechanism 93 (refer to FIG. 1) discharges the can body 10 to the outside of the print system 500.

Here, the first discharge mechanism 93 is provided on the lateral side of the fourth connecting route 980 (on the lateral side and outside of the annular moving route 732), and, when the moving unit 550 is positioned on the fourth connecting route 980, the first discharge mechanism 93 discharges the can body 10 supported by the moving unit 550.

In the first discharge mechanism 93, compressed air is supplied to the inside of the cylindrically-formed support member 20, to move the can body 10 in the axial direction thereof (in the direction perpendicular to the page of FIG. 1).

Further, the bottom portion 10A (the closed end portion) of the can body 10 is sucked by a not-shown suction member. Then, by the suction member, the can body 10 is conveyed to the outside of the print system 500; thereby the can body 10 is discharged to the outside of the print system 500.

On the downstream side of the first discharge mechanism 93, the inkjet printing part 700 is provided.

The inkjet printing part 700, as an example of an image forming unit, forms an image onto an outer surface 10X of the can body 10 moved from the upstream side by use of the inkjet printing method.

To additionally describe, the inkjet printing part 700 performs image formation onto the can body 10 supported by the moving unit 550.

To additionally describe, in the exemplary embodiment, when image formation by the inkjet printing part 700 is performed, the moving units 550 sequentially move from the upstream side of the inkjet printing part 700 toward the inkjet printing part 700 (refer to the arrow 1A).

In the exemplary embodiment, image formation by the inkjet printing part 700 is performed onto the can bodies 10 on the moving units 550.

Here, the image formation by the inkjet printing method refers to image formation performed by ejecting ink from inkjet heads 11 to attach the ink to the can body 10.

In the image formation by the inkjet printing method, known methods can be used. Specifically, for example, a piezo system, a thermal (bubble) system, a continuous system or the like can be used.

On a downstream side of the inkjet printing part 700, a light irradiation part 750 is provided as an example of a curing unit.

The light irradiation part 750 includes a light source (not shown) and irradiates the outer surface 10X of the can body 10, on which image formation by the inkjet printing part 700 has been performed, with light, to thereby cure the image formed on the outer surface 10X.

In the inkjet printing part 700, the image is formed by use of ultraviolet cure ink. To additionally describe, in the inkjet printing part 700, the image is formed by use of actinic radiation cure ink.

In the light irradiation part 750, the formed image is irradiated with light, such as ultraviolet light. This cures the image formed on the outer surface 10X of the can body 10.

On the downstream side of the light irradiation part 750, a second inspection device 300, as an example of an inspection unit, that carries out inspection of the image formed by the inkjet printing part 700 on the outer surface 10X of the can body 10 is provided.

The second inspection device 300, as an example of the processing unit, carries out inspection of the can body 10, which is an example of processing for the can body 10 supported by the moving unit 550 positioned on the first linear moving route 910.

Here, in the exemplary embodiment, both lateral sides of the first linear moving route 910 and the second linear moving route 920, the inspection devices (the first inspection device 92 and the second inspection device 300) carrying out the inspection of the can bodies 10 are provided. To additionally describe, in the exemplary embodiment, the processing units that carry out processing on the can bodies 10 are provided on both lateral sides of the first linear moving route 910 and the second linear moving route 920.

In the case where the processing units are provided on both lateral sides of the first linear moving route 910 and the second linear moving route 920, it is possible to further reduce the occupation area of the print system 500, as compared to the case where the processing units are provided only on one lateral side.

Here, for example, if one processing unit is provided only on one lateral side and the other processing unit, which was planned to be provided on the other lateral side, is provided on the lateral side of, for example, the upper moving route 930, the full length of the upper moving route 930 is increased, and, with this, the size of the print system 500 in the direction indicated by the reference sign 1E is also increased. Then, in this case, the occupation area of the print system 500 is increased.

In contrast thereto, in the case where the processing units are provided on both lateral sides of the first linear moving route 910 and the second linear moving route 920 as in the exemplary embodiment, it is possible to reduce the size of the print system 500 in the direction indicated by the reference sign 1E, and reduce the occupation area of the print system 500.

Moreover, in the exemplary embodiment, the second inspection device 300 is provided on the upstream side of a protection layer forming part 770 (to be described later) in the moving direction of the can body 10, and, in the exemplary embodiment, inspection of the image formed on the can body 10 is performed before application of paint onto the can body 10 by the protection layer forming part 770.

In addition, in the exemplary embodiment, the inkjet printing part 700 and the light irradiation part 750 are provided on the lateral side of the upper moving route 930.

Further, on the downstream side of the second inspection device 300 in the moving direction of the can body 10, a second discharge mechanism 400, as an example of the discharge unit, that discharges the can body 10 positioned on the can body moving route 800 from the print system 500 (the can body moving route 800) is provided.

The second discharge mechanism 400 discharges the can body 10, the result of inspection of which performed by the second discharge mechanism 300 satisfies predetermined conditions, from the print system 500. To put it another way, the second discharge mechanism 400 discharges the so-called defective can, in which the image formed thereon includes defects, from the print system 500.

In the exemplary embodiment, the second inspection device 300 is provided on the lateral side of the first linear moving route 910, the second discharge mechanism 400 is provided on the lateral side of the lower moving route 940, and the second connecting route 960 is provided between the second inspection device 300 and the second discharge mechanism 400.

In the exemplary embodiment, while the moving unit 550 is moving through the second connecting route 960, analytical processing by the second inspection device 300 is carried out, and the results of inspection by the second inspection device 300 are outputted.

Note that the same is true for the first inspection device 92; while the moving unit 550 is moving through the fourth connecting route 980, analytical processing by the first inspection device 92 is carried out, and the results of inspection by the first inspection device 92 are outputted.

In the second discharge mechanism 400, similar to the first discharge mechanism 93, compressed air is supplied to the inside of the cylindrically-formed support member 20, to move the can body 10 in the axial direction thereof (in the direction perpendicular to the page of FIG. 1).

Further, the bottom portion 10A (the closed end portion) of the can body 10 is sucked by a not-shown suction member. Then, by the suction member, the can body 10 is conveyed to the outside of the print system 500; thereby the can body 10 is discharged to the outside of the print system 500.

To additionally describe, the can body 10 is conveyed to the outside of the can body moving route 800 to be discharged.

Further, in the exemplary embodiment, in the moving direction of the can body 10, the protection layer forming part 770 is provided on the downstream side of the second discharge mechanism 400.

After image formation onto the can body 10 has been performed by the inkjet printing part 700, the protection layer forming part 770, as an example of paint application unit, applies transparent paint onto the outer surface 10X of the can body 10.

More specifically, the protection layer forming part 770 brings a roll-shaped member 701 with the paint on the outer circumferential surface thereof into contact with the outer surface 10X of the can body 10, to thereby apply the transparent paint to the outer surface 10X.

To additionally describe, the protection layer forming part 770 applies the transparent paint on the image formed by the inkjet printing part 700 to form a transparent layer covering the image. Consequently, a transparent protection layer is formed as the outermost layer of the can body 10.

On the downstream side of the protection layer forming part 770, a detachment part 780 (can body discharge part) detaching the can body 10 from the support member 20 is provided.

In the exemplary embodiment, the can body 10 is detached from the support member 20 in the detachment part 780 to be discharged to the outside of the print system 500.

Here, in the exemplary embodiment, the second discharge mechanism 400, the protection layer forming part 770, the detachment part 780, and the can body supply part 510 performing processing on the can body 10 are provided on the lateral side (lower side) of the lower moving route 940.

Further, in the exemplary embodiment, also on the lateral side (upper side) of the upper moving route 930, the inkjet printing part 700 and the light irradiation part 750 performing processing on the can body 10 are provided.

Thus, in the exemplary embodiment, the processing units performing processing on the can body 10 are provided on both lateral sides of the upper moving route 930 and the lower moving route 940.

Here, as in the exemplary embodiment, in the case where the transparent paint is applied onto an image after the image has been formed on the can body 10, image defects generated in forming the image are less likely to be noticeable in some cases.

To additionally describe, even though there are defects, such as missing dots, in part of the image formed by the inkjet printing part 700, application of the paint makes the defects less noticeable, and thereby the defects are less likely to be detected by the second inspection device 300.

In contrast thereto, as in the exemplary embodiment, in the case where the second inspection device 300 is provided on the upstream side of the protection layer forming part 770 to perform inspection of the image before the paint is applied onto the can body 10 by the protection layer forming part 770, the image defects are more likely to be detected.

To additionally describe, in the case where the inspection of the image is performed before the paint is applied onto the can body 10 by the protection layer forming part 770, since the inspection is performed in the state where no paint is applied, the image defects are more likely to be detected.

Note that, in the exemplary embodiment, image formation onto the can body 10 is performed by use of the inkjet heads 11; however, the image formation onto the can body 10 may be performed by use of the plate printing method, such as relief printing.

Then, in this case (the case of performing printing by the plate printing method), also, similar to the above, inspection of the image before applying the paint makes the image defects more likely to be detected.

Next, the inkjet printing part 700 will be described.

The inkjet printing part 700 shown in FIG. 1 is disposed above (on the lateral side of) the upper moving route 930 to perform image formation onto the can body 10 supported by the moving unit 550 positioned on the upper moving route 930.

The inkjet printing part 700 is provided with plural inkjet heads 11 arranged in line in the left and right directions in the figure. The portion where the plural inkjet heads 11 are provided can be grasped as the image forming unit that performs image formation onto the can body 10.

Specifically, the inkjet printing part 700 is provided with a first inkjet head 11C ejecting cyan ink, a second inkjet head 11M ejecting magenta ink, a third inkjet head 11Y ejecting yellow ink and a fourth inkjet head 11K ejecting black ink.

In the following description, when the first inkjet head 11C to the fourth inkjet head 11K are not particularly distinguished, the inkjet heads are simply referred to as "inkjet heads 11."

Note that, in the exemplary embodiment, the case in which the four inkjet heads 11 were provided was shown as an example; however, an inkjet head 11 ejecting ink of a special color, such as a corporate color, or an inkjet head 11 for forming a white layer may be provided further.

Here, the four inkjet heads 11, namely, the first inkjet head 11C to the fourth inkjet head 11K perform image formation onto the can body 10 by use of the ultraviolet cure ink.

Moreover, in the exemplary embodiment, the can body 10 is moved in a state of being laid (the can body 10 is moved in the state in which the axial direction of the can body 10 extends along the horizontal state), and a part of the outer surface 10X of the can body 10 faces upward in the vertical direction.

In the exemplary embodiment, ink is ejected downwardly from above the outer surface 10X, to thereby perform image formation onto the outer surface 10X of the can body 10.

Moreover, in the exemplary embodiment, the moving unit 550 stops under each of the inkjet heads 11 and the ink is ejected to the can body 10 on the moving unit 550, and thereby the image formation onto the can body 10 is performed.

Then, in the exemplary embodiment, when the image formation onto the can body 10 is finished, the moving unit 550 moves to the next inkjet head 11 positioned on the downstream side, and the image formation onto the can body 10 is also performed by the inkjet head 11.

Further, in the exemplary embodiment, the four inkjet heads 11 are arranged in line along the moving direction of the can body 10. Moreover, each of the four inkjet heads 11 is disposed along a direction perpendicular to (crossing) the moving direction of the can body 10.

In the exemplary embodiment, in a process in which the can body 10 passes through below the four inkjet heads 11, ink is ejected to the can body 10 from above, and thereby an image is formed on the can body 10.

More specifically, in the exemplary embodiment, the moving unit 550 stops at the installation location of each of the plural inkjet heads 11 that have been provided.

Then, in each of the inkjet heads 11, ink is ejected onto the can body 10, to thereby form an image onto the can body 10. Note that, when the image formation if performed in each of the inkjet heads 11, the can body 10 rotates in the circumferential direction.

Each of the moving units 550, as an example of a moving body, moves at a predetermined moving speed.

Moreover, each of the moving units 550 stops at each of the can body supply part 510, the first inspection device 92, the first discharge mechanism 93, each of the inkjet heads 11, the light irradiation part 750, the second inspection device 300, the second discharge mechanism 400, the protection layer forming part 770 and the detachment part 780.

Moreover, at the installation location of the first inspection device 92, each of the inkjet heads 11, the light irradiation part 750, the second inspection device 300, the protection layer forming part 770, and the like, the can body 10 on the moving unit 550 rotates in the circumferential direction at the predetermined rotation speed.

In addition, in the print system 500 of the exemplary embodiment, the moving units 550, the number of which is larger than the number of can bodies 10 positioned in the print system 500, are installed. Further, the moving units 550 move around the axial center 800C.

The moving mechanism 560 is provided with an annular-shaped guidance member 561 that guides the moving units 550. Inside the guidance member 561, electromagnets (not shown) are provided.

Further, in the moving unit 550, a permanent magnet (not shown) is installed.

In the exemplary embodiment, a linear-motor mechanism is used to move the moving units 550.

More specifically, the print system 500 of the exemplary embodiment is provided with a control part 900 that controls energization to the above-described electromagnets to generate magnetic fields for moving each of the moving units 550. The control part 900 is composed of a program-controlled CPU (Central Processing Unit).

As shown in FIG. 1, the moving unit 550 is provided with a pedestal part 551 guided by the guidance member 561. In the pedestal part 551, the permanent magnet (not shown) is installed.

In the exemplary embodiment, a propulsive force occurs in the moving unit 550 by magnetic fields generated by electromagnets provided to the guidance member 561 and the permanent magnet provided to the pedestal part 551 of the moving unit 550, and thereby the moving unit 550 moves along the annular moving route 732.

The moving unit 550 of the exemplary embodiment is provided with the cylindrical support member 20 supporting the can body 10 and a fixing member (not shown) for fixing the support member 20 to the pedestal part 551.

The support member 20 is formed into the cylindrical shape, and inserted into the can body 10 through the opening portion formed in the can body 10 to support the can body 10. In addition, the support member 20 is disposed in the state of being laid (along the horizontal direction). Consequently, in the exemplary embodiment, the can body 10 is also disposed in the state of being laid.

In the exemplary embodiment, when the can body 10 reaches each of the inkjet heads 11, ink is ejected from each of the inkjet heads 11 to the can body 10 positioned below. Consequently, an image is formed on the outer surface 10X of the can body 10.

The light irradiation part 750 is disposed on the downstream side of the inkjet printing part 700 and irradiates the can body 10 with the ultraviolet light being an example of light. Consequently, the image formed on the outer surface (outer circumferential surface) 10X of the can body 10 (the image formed by the inkjet printing part 700) is cured.

Note that, when image formation onto the can body 10 is performed, thermosetting ink may also be used; in this case, for example, a heat source, not a light source, is installed at the location where the light irradiation part 750 is provided.

In the exemplary embodiment, the moving unit 550 stops every time the moving unit 550 reaches below each of the inkjet heads 11. In other words, the moving unit 550 stops at each of predetermined stop locations.

Then, in the exemplary embodiment, onto the outer surface 10X of the can body 10 held by the moving unit 550 stopped at the predetermined stop location, an image is formed by the inkjet heads 11 as an example of the image forming unit.

More specifically, at the installation location of each of the inkjet heads 11, ejection of ink from the inkjet head 11 is performed in the state in which the support member 20 (the can body 10) rotates in the circumferential direction, to thereby form an image onto the outer surface 10X of the can body 10.

In the exemplary embodiment, when the support member 20 rotates 360° after ejection of ink is started, ejection of ink is stopped. Consequently, an image is formed on the entire region in the circumferential direction of the outer surface 10X of the can body 10.

In the exemplary embodiment, the support member 20 shown in FIG. 1 is disposed along the direction perpendicular to the page of FIG. 1. To put it another way, the support member 20 is disposed to extend along the horizontal direction.

Moreover, the support member 20 is disposed along the direction perpendicular to (crossing) the moving direction of the moving unit 550.

Moreover, in the exemplary embodiment, the inkjet heads 11 are positioned above the can body 10, and the ink is ejected to the can body 10 from above.

In this case, as compared to a case in which the inkjet heads 11 are disposed at the lateral side of the can body 10 or below the can body 10, it is possible to reduce the effect of gravity acting on ink droplets ejected from the inkjet heads 11, to thereby increase accuracy of ink adhesive positions in the can body 10.

Further, in the exemplary embodiment, the inkjet printing part 700 (the plural inkjet heads 11) is provided on the lateral side of (above) the upper moving route 930 (horizontal moving route).

Consequently, as compared to the case in which the inkjet printing part 700 (the plural inkjet heads 11) is provided on the lateral side of the curved part (the route having the curvature as, for example, the first connecting route 950 to the fourth connecting route 980), quality of the image to be formed on the can body 10 is likely to be improved.

Figure 3:
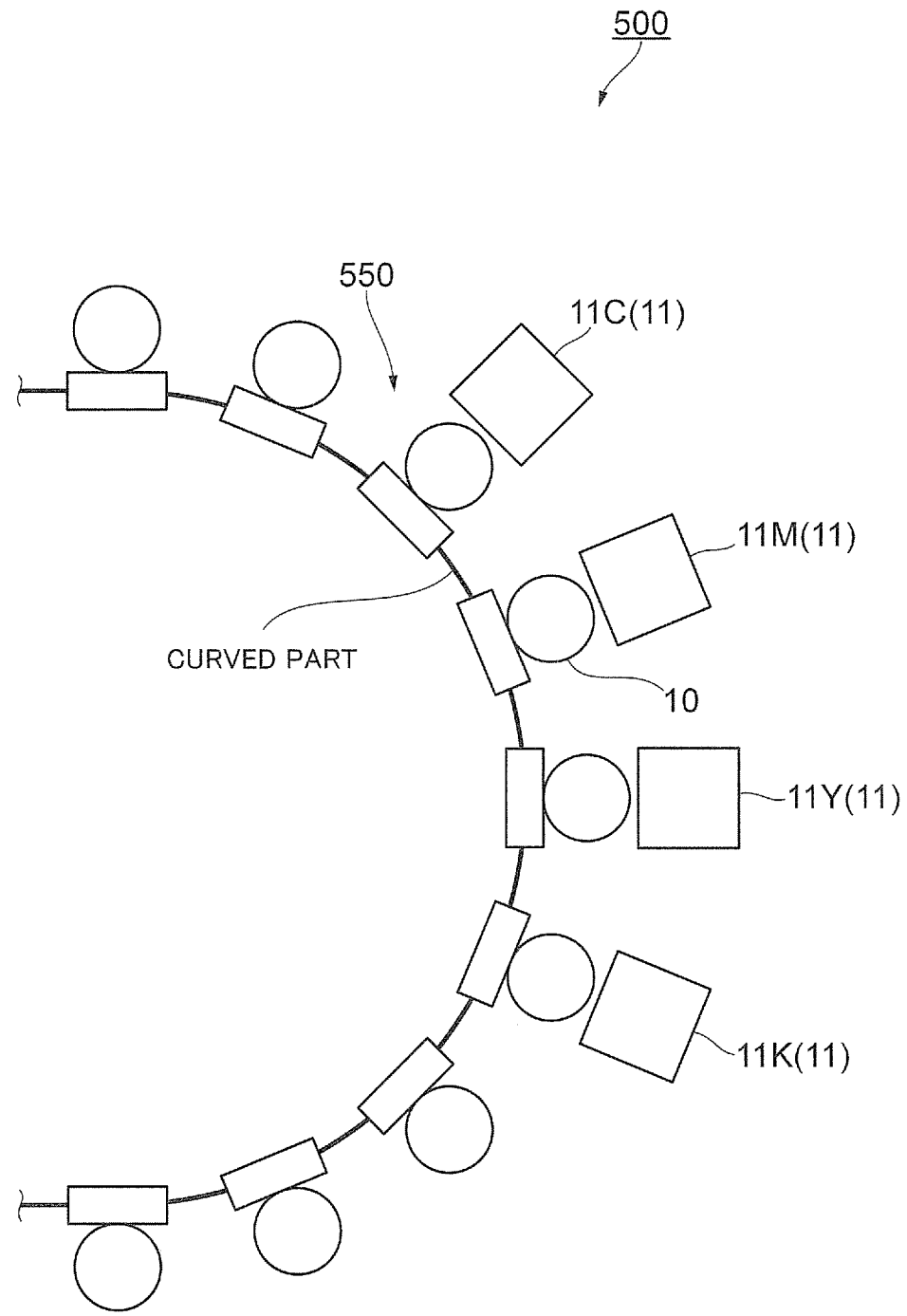
FIG. 3 is a diagram showing another configuration example of the print system.

Here, in the case where the inkjet heads 11 are provided on the lateral side of the curved part, for example, as shown in FIG. 3 (a diagram showing another configuration example of the print system 500), the attitudes of the inkjet heads 11 are different in each of the inkjet heads 11.

In this case, as compared to the case where the attitudes of the inkjet heads 11 are the same, the quality of the image to be formed is likely to be degraded due to occurrence of misregistration among images formed by the respective inkjet heads 11.

In contrast thereto, if the inkjet printing part 700 is provided on the lateral side of the linear part (the upper moving route 930 (horizontal moving route)) as in the exemplary embodiment, the attitudes of the plural inkjet heads 11 are easily aligned, and thereby degradation of quality of the image to be formed can be suppressed.

To additionally describe, the exemplary embodiment has the configuration in which the inkjet printing part 700, which is the image forming unit, performs image formation onto the can body 10 when the moving unit 550 is positioned on the horizontal moving route; in this case, degradation of quality of the image to be formed is suppressed with ease.

Figure 4:
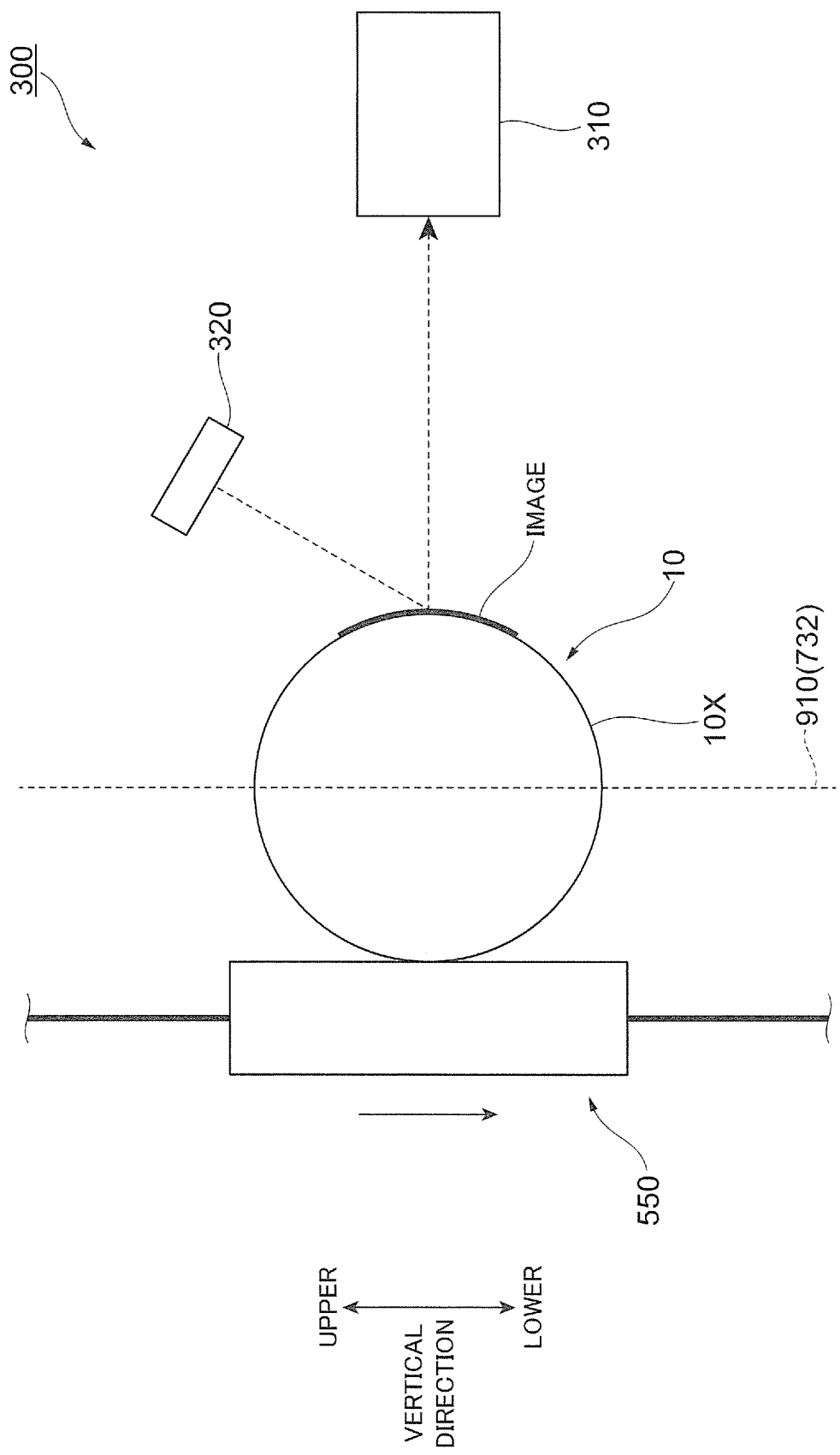
FIG. 4 is a diagram illustrating a second inspection device.

FIG. 4 is a diagram illustrating the second inspection device 300.

The second inspection device 300 of the exemplary embodiment is provided with a photographing device 310, as an example of a photographing unit that takes a photograph of the image formed on the outer surface 10X of the can body 10.

The photographing device 310 is configured to include a photographing element, such as a CCD (Charge Coupled Device). Further, the second inspection device 300 is provided with a light source 320 emitting light with which the can body 10 is irradiated.

The second inspection device 300 analyzes the image obtained by the photographing device 310, and thereby performs inspection of the image formed on the outer surface 10X of the can body 10.

More specifically, the second inspection device 300 compares, for example, the image obtained by the photographing device 310 and a reference image registered in advance; thereby the inspection to determine whether or not the image formed on the outer surface 10X of the can body 10 has defects is carried out.

Here, in the exemplary embodiment, when the moving unit 550 is positioned on the first linear moving route 910 that is linearly formed, the image formed on the outer surface 10X of the can body 10 on the moving unit 550 is photographed by use of the photographing device 310.

To additionally describe, in the exemplary embodiment, when the moving unit 550 is positioned on the first linear moving route 910, inspection of the image formed on the outer surface 10X of the can body 10 is performed by the second inspection device 300.

Consequently, in the exemplary embodiment, accuracy of inspection of the image on the can body 10 can be increased, as compared to the case in which the inspection of the can body 10 (photo shooting of the can body 10) is performed when the can body 10 is positioned on the first connecting route 950 or the like having the curvature.

Here, of the annular moving route 732, at the portion with the curvature, the accuracy of the stop position of the moving unit 550 (can body 10) is likely to be degraded.

In this case, the position of the can body 10 in photographing the can body 10 by using the photographing device 310 is liable to vary, and the inspection accuracy of the image is likely to be degraded due to the variation.

In contrast thereto, in the case where the inspection (photo shooting) of the can body 10 is performed when the can body 10 is positioned on the first linear moving route 910 as in the exemplary embodiment, variation in the position of the can body 10 is less likely to be generated, and thereby it is easily possible to increase the accuracy of the inspection of the image on the can body 10.

Further, in the exemplary embodiment, as shown in FIG. 1, in the moving direction of the can body 10, the second discharge mechanism 400, as an example of the discharge unit, is provided on the upstream side of the protection layer forming part 770, as an example of the paint application unit.

Consequently, in the exemplary embodiment, the defective can is discharged from the print system 500 before the paint is applied. In this case, the amount of paint to be used can be reduced, as compared to the case in which even the defective can is subjected to application of the paint.

Further, in the exemplary embodiment, the second inspection device 300 performs inspection of the image after being cured by the light irradiation part 750 and before application of the paint.

To additionally describe, in the exemplary embodiment, in the moving direction of the can body 10, the second inspection device 300 is provided on the downstream side of the light irradiation part 750 and on the upstream side of the protection layer forming part 770, to thereby perform inspection of the image that is cured by the light irradiation part 750 prior to application of the paint on the surface thereof.

Here, in the case where the inspection of the image is performed before the image is cured, there is a risk that a change occurs in the image after the inspection and the state of the image is changed. Moreover, if the inspection of the image is performed after the paint is applied onto the surface of the image, the image defects generated in forming the image become less noticeable, and thereby the defects are less likely to be detected, as described above.

In contrast thereto, if the inspection is performed on the image after being cured by the light irradiation part 750 and before being subjected to application of the paint on the surface thereof as in the exemplary embodiment, changes in the image after the inspection can be suppressed, and further, the defects generated in the image can be detected more accurately.

Further, in the exemplary embodiment, the first linear moving route 910 and the second linear moving route 920 are disposed along the up-and-down direction; accordingly, in the exemplary embodiment, compatibility between improvement in processing accuracy for the can body 10 and reduction of the occupation area of the print system 500 is sought after.

Here, in the case where the processing on the can body 10 is to be performed when the moving unit 550 is positioned on a linear moving route, such as the first linear moving route 910 or the second linear moving route 920, degradation of processing accuracy arising from the positional accuracy of the moving unit 550 can be suppressed, as compared to the case in which the processing on the can body 10 is to be performed when the moving unit 550 is positioned on the moving route having a curvature.

For this reason, it is preferable that the processing on the can body 10 is performed when the moving unit 550 is positioned on the linear moving route.

Here, in the exemplary embodiment, the upper moving route 930 and the lower moving route 940 are also provided as the linear moving route; therefore, it is possible to consider a mode in which the first inspection device 92 and the second inspection device 300 are provided on the lateral sides of the upper moving route 930 and the lower moving route 940.

Incidentally, in this case, the size of the print system 500 in the direction indicated by the reference sign 1E is increased, and accordingly, the occupation area of the print system 500 tends to be increased.

In contrast thereto, in the case where the first inspection device 92 and the second inspection device 300 are provided on the lateral sides of the first linear moving route 910 and the second linear moving route 920 extending in the up-and-down direction, as in the exemplary embodiment, it becomes possible to reduce the size of the print system 500 in the direction indicated by the reference sign 1E (it becomes possible to reduce the occupation area of the print system 500) while suppressing degradation of the inspection accuracy.

Further, in the exemplary embodiment, the processing units that carry out processing on the can bodies 10 are provided on both lateral sides of the first linear moving route 910 and the second linear moving route 920 as described above.

Specifically, the second inspection device 300 is provided on the lateral side of the first linear moving route 910, and the first inspection device 92 is provided on the lateral side of the second linear moving route 920.

Here, it is possible to consider a mode in which, for example, the processing unit, such as the first inspection device 92, is provided only on the lateral side of the first linear moving route 910, whereas the processing unit is not provided on the lateral side of the second linear moving route 920. To additionally describe, it is possible to consider a mode in which the processing units are provided only on one of the lateral sides of the two linear moving routes.

By the way, in this case, the processing unit, which was planned to be provided on the other lateral side, is to be provided, for example, on the lateral side of the upper moving route 930; in this case, the full length of the upper moving route 930 is increased, and, with this, the occupation area of the print system 500 is apt to be increased.

In contrast thereto, if the processing units are provided on both lateral sides of the first linear moving route 910 and the second linear moving route 920, it is possible to reduce the occupation area of the print system 500, as compared to the case where the processing units are provided only on one lateral side.

Figure 5:
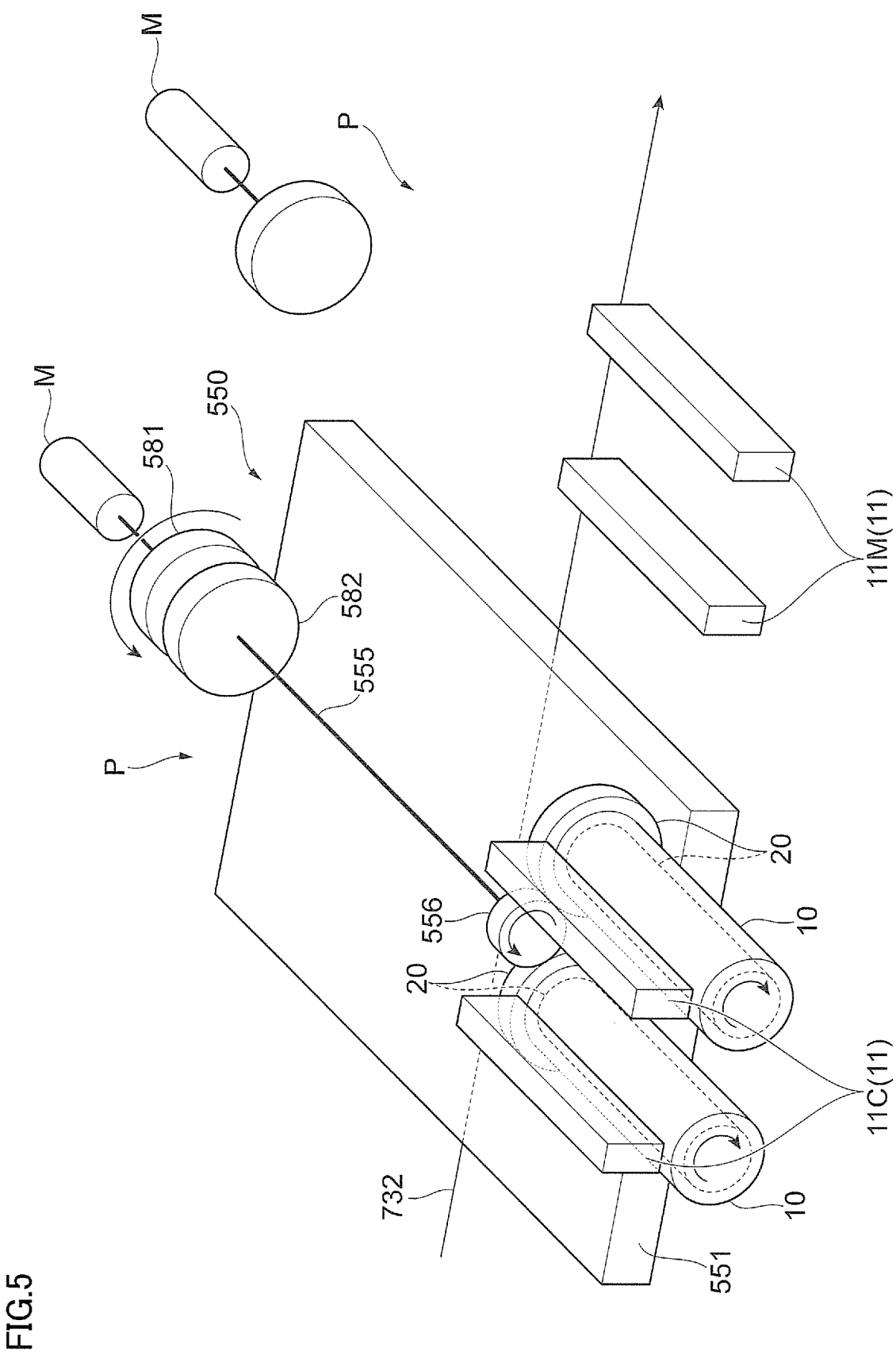
FIG. 5 is a diagram showing a case in which a first inkjet head, a second inkjet head, and a moving unit are viewed from a direction of the arrow V in FIG. 1.

FIG. 5 is a diagram showing a case in which the first inkjet head 11C, the second inkjet head 11M, and the moving unit 550 are viewed from a direction of the arrow V in FIG. 1.

Note that, in FIG. 5, illustration of the moving unit 550 positioned directly below the second inkjet head 11M is omitted.

Though illustration is omitted in FIG. 1, in the exemplary embodiment, as shown in FIG. 5, each of the stop locations P, where the moving unit 550 stops, is provided with a servomotor M, as an example of a driving source that rotates the can body 10.

To additionally describe, the servomotors M for rotating the can bodies 10 supported by the moving units 550 are provided beside the annular moving route 732 of the moving units 550.

In the exemplary embodiment, the driving sources (servomotors M) for rotating the can bodies 10 are not provided to the moving units 550, but are provided to the main body side of the print system 500.

To additionally describe, in the exemplary embodiment, the driving sources for rotating the can bodies 10 are not provided to the moving units 550, but are provided to locations different from the moving units 550.

Consequently, the moving units 550 can be made light, and therefore, vibrations of the print system 500 caused by movement of the moving units 550 are reduced.

Here, if the moving unit 550 is provided with the driving source, and thereby the moving unit 550 has a large weight, vibrations of the print system 500 when the moving units 550 are stopped are likely to be increased. Then, in this case, the inkjet heads 11 and the like vibrate, to thereby lead to degradation of image quality.

In contrast thereto, as in the exemplary embodiment, in the configuration in which the driving sources are provided to the main body side of the print system 500, the moving unit 550 is made lighter in weight, and thereby vibrations of the print system 500 when the moving units 550 are stopped are reduced.

As shown in FIG. 5, the moving unit 550 is provided with the pedestal part 551.

Further, two can bodies 10 are provided on the pedestal part 551. The support member 20 is inserted into each of the can bodies 10; accordingly, the can body 10 is supported by the support member 20. Note that, in the exemplary embodiment, the description is given by taking the case in which the two can bodies 10 are provided on the single moving unit 550 as an example; however, three or more can bodies 10 may be provided on the single moving unit 550.

In addition, the moving unit 550 is provided with a transmission shaft 555 for transmitting the rotational driving force to the can body 10; in the exemplary embodiment, the rotational driving force from the servomotor M is transmitted to the can body 10 via the transmission shaft 555.

More specifically, in the exemplary embodiment, a rotation gear 556 to be in contact with each of the support members 20 to rotate the support member 20 is provided.

The rotation gear 556 is rotated by the transmission shaft 555, and thereby the can body 10 is rotated in the circumferential direction. Note that, in the exemplary embodiment, the two can bodies 10 provided on each moving unit 550 are rotated in the same direction.

Here, in the exemplary embodiment, transmitting of the driving force from the servomotor M, which is the driving source, to the moving unit 550 is carried out by the so-called magnet coupling.

Specifically, in the exemplary embodiment, a driving-source-side rotation body 581 rotated by the servomotor M is provided on the servomotor M side (main body side of the print system 500).

Further, in the exemplary embodiment, a moving-body-side rotation body 582 is provided on the moving unit 550 side, the moving-body-side rotation body 582 being provided coaxially with the transmission shaft 555.

In the exemplary embodiment, the can body 10 is rotated by the driving force transmitted from the driving-source-side rotation body 581 to the moving-body-side rotation body 582.

More specifically, in the exemplary embodiment, the moving-body-side rotation body 582 rotates in synchronization with the driving-source-side rotation body 581 by use of the magnetic force, and thereby the driving force is transmitted from the driving-source-side rotation body 581 to the moving-body-side rotation body 582.

To additionally describe, in the exemplary embodiment, the magnet is provided to at least one of the driving-source-side rotation body 581 and the moving-body-side rotation body 582, and an attracted body attracted by the magnet is provided to the other one.

Consequently, in the exemplary embodiment, the magnetic force generated in the magnet is used to rotate the moving-body-side rotation body 582 in synchronization with the driving-source-side rotation body 581.

Then, in the exemplary embodiment, when the moving-body-side rotation body 582 is rotated, the transmission shaft 555 is rotated in response thereto; with this, the can body 10 rotates in the circumferential direction.

In the exemplary embodiment, when the driving force is transmitted from the driving-source-side rotation body 581 to the moving-body-side rotation body 582 (when the moving unit 550 stops at the stop location P), the driving-source-side rotation body 581 and the moving-body-side rotation body 582 are disposed to face each other as shown in FIG. 5.

Further, in the exemplary embodiment, the driving-source-side rotation body 581 and the moving-body-side rotation body 582 are disposed in the non-contact state at this time.

Here, in the case where the driving-source-side rotation body 581 and the moving-body-side rotation body 582 are in the non-contact state as described above, displacement of the moving unit 550 due to the contact between the driving-source-side rotation body 581 and the moving-body-side rotation body 582 is suppressed, and thereby misregistration in formation positions of images due to the displacement of the moving unit 550 can be suppressed.

[Others]

In the above, the moving unit 550 is moved by using a so-called linear motor mechanism, but movement of the moving unit 550 is not limited to the linear motor mechanism; for example, the movement may be performed by attaching the moving unit 550 to an endless member (a member such as a belt or a chain) and orbitally moving the endless member.

Moreover, for example, it may be possible to provide a driving source, such as a motor, for moving the moving unit 550 to each of the moving units 550, to thereby move the moving unit 550 autonomously.

Moreover, in the above, the case in which the driving source (servomotor M) was provided to the installation location of the inkjet head 11 was shown; however, the driving sources are provided to other locations, such as the first inspection device 92 (refer to FIG. 1), the light irradiation part 750, the second inspection device 300, and the protection layer forming part 770.

In the exemplary embodiment, in the other locations, the can body 10 is rotated by the driving source provided separately from the moving unit 550.

Moreover, in the above, the description was given by taking the case in which the driving-source-side rotation body 581 and the moving-body-side rotation body 582 were disposed in the non-contact state as an example; however, the driving-source-side rotation body 581 and the moving-body-side rotation body 582 may be disposed in the contact state, to thereby supply the driving force to the can body 10 through the driving-source-side rotation body 581 and the moving-body-side rotation body 582 that are in contact with each other.

In addition, in the above, the driving source (servomotor M) for rotating the can body 10 was provided to the location other than the moving unit 550; however, the driving source for rotating the can body 10 may be provided to the moving unit 550.

REFERENCE SIGNS LIST

10 Can body
500 Print system
550 Moving unit
700 Inkjet printing part
732 Annular moving route

The invention claimed is:

1. A print system comprising:
   a moving body supporting a can body and moving;
   an annular moving route that is an annular-shaped moving route, along which the moving body moves, including:
      a horizontal moving route, being a moving route extending along a horizontal direction;
      a first linear moving route, being connected to the horizontal moving route, extending from an upper side toward a lower side and being formed linearly, through which the moving body moves from the upper side toward the lower side; and
      a second linear moving route, being connected to the horizontal moving route, extending from the lower side toward the upper side and being formed linearly, through which the moving body moves from the lower side toward the upper side;
   an image forming unit, being disposed above the horizontal moving route and performing image formation onto the can body supported by the moving body;
   a first inspection device, being disposed on a lateral side of the second linear moving route, and performing inspection of the can body supported by the moving body before an image is formed by the image forming unit; and
   a second inspection device, being disposed on a lateral side of the first linear moving route, and performing inspection of the can body supported by the moving body after the image is formed by the image forming unit.

2. The print system according to claim 1, wherein the first linear moving route and the second linear moving route are disposed along a vertical direction.

3. The print system according to claim 1, wherein the image formation onto the can body supported by the moving body is performed by the image forming unit when the moving body is positioned on the horizontal moving route.

4. The print system according to claim 1, wherein the horizontal moving route extends along the horizontal direction and is formed linearly.

5. The print system according to claim 1, wherein the horizontal moving route includes a plurality of horizontal moving routes, the routes being provided to be displaced from one another in an up-and-down direction.

6. The print system according to claim 5, wherein
   an upper moving route and a lower moving route are provided as the plurality of horizontal moving routes displaced from one another in the up-and-down direction, and
   the upper moving route and the lower moving route are disposed in parallel with each other.

7. The print system according to claim 6, wherein, when the upper moving route and the lower moving route are projected downward in the vertical direction, the upper moving route and the lower moving route overlap each other.

8. The print system according to claim 5, wherein
   an upper moving route and a lower moving route are provided as the plurality of horizontal moving routes displaced from one another in the vertical direction, and
   a processing unit performing processing on the can body supported by the moving body is provided on each of both lateral sides of the upper moving route and the lower moving route.

9. The print system according to claim 1, wherein
   the first linear moving route and the second linear moving route are disposed in parallel with each other.

10. The print system according to claim 1, wherein the annular moving route is disposed on a plane extending along a vertical direction.

11. The print system according to claim 1, further comprising:
    a paint application unit applying paint on an outer surface of the can body after the image formation onto the outer surface of the can body is performed by the image forming unit;
    wherein the second inspection device performing inspection of the image formed on the outer surface by the image forming unit before the paint is applied by the paint application unit.

12. The print system according to claim 11, further comprising:
    a discharge unit discharging the can body, a result of an inspection of which performed by the second inspection unit satisfying a predetermined condition, from the print system, wherein
    the discharge unit is disposed on an upstream side of the paint application unit in a moving direction of the can body.

13. The print system according to claim 1, wherein
    the annular moving route is provided with a connecting route having a curvature and being projected outward from the annular moving route to connect an upper end of the second linear moving route and the horizontal moving route,
    wherein the print system further comprises a discharge unit discharging the can body, a result of an inspection of which performed by the first inspection device not satisfying a predetermined condition, from the print system;
    the discharge unit is provided on a lateral side of the connecting route having the curvature.

14. The print system according to claim 1, further comprising:
    a lower moving route, being disposed below the horizontal moving route, and
    wherein the lower moving route extends along the horizontal direction and is directed from the first linear moving route to the second linear moving route along which the moving body passes.

* * * * *